United States Patent
Siegmanski et al.

(10) Patent No.: US 12,552,570 B2
(45) Date of Patent: Feb. 17, 2026

(54) FILLING LINE FOR PRODUCING FOODS MADE OF A PASTY MASS AND ASSOCIATED METHODS

(71) Applicant: VEMAG Maschinenbau GmbH, Verden (DE)

(72) Inventors: Karsten Siegmanski, Verden (DE); Florian Rueckershaeuser, Kirchlintein (DE); Dirk Buhr, Celle (DE)

(73) Assignee: VEMAG Maschinenbau GmbH, Verden (DE)

( * ) Notice: Subject to any disclaimer, the term of this patent is extended or adjusted under 35 U.S.C. 154(b) by 449 days.

(21) Appl. No.: 18/342,648

(22) Filed: Jun. 27, 2023

(65) Prior Publication Data

US 2023/0415942 A1  Dec. 28, 2023

(30) Foreign Application Priority Data

Jun. 27, 2022  (DE) .......................... 102022115961.2

(51) Int. Cl.
*B65B 57/00* (2006.01)
*A22C 11/02* (2006.01)
(Continued)

(52) U.S. Cl.
CPC .......... *B65B 57/00* (2013.01); *A22C 11/0245* (2013.01); *B65B 9/10* (2013.01)

(58) Field of Classification Search
CPC .. B65B 57/00; B65B 9/10; B65B 3/26; B65B 25/00; B65B 65/003; B65B 57/16; A22C 11/0245; G05B 19/41845; G05B 19/41865
(Continued)

(56) References Cited

U.S. PATENT DOCUMENTS 4,853,881 A    8/1989  Yamada
6,054,155 A *  4/2000  Kobussen .......... A22C 13/0016
                                                426/305
(Continued)

FOREIGN PATENT DOCUMENTS

CN     110830276 A    2/2020
DE     10222584 A1   12/2003
(Continued)

OTHER PUBLICATIONS

European Patent Office, Search Report issued in EP Application No. 23181707.3-1205, dated Nov. 28, 2023, 14 pages.
(Continued)

*Primary Examiner* — Jaime Figueroa
(74) *Attorney, Agent, or Firm* — Wood, Herron & Evans LLP

(57) ABSTRACT

A filling line is provided and includes a first filling machine having a first machine controller, and one or more second filling machines having a second machine controller, which is selectively operable independently of the first filling machine. The filling line also includes a data interface for connecting the machine controllers to each other for control communication. The machine controllers are configured to be operated reciprocally either in a slave control mode or in a master control mode, depending on control information provided. The slave control mode transmits read and write rights in respect of recipe-relevant process parameters to the machine controller operated in the master control mode, and the master control mode implements the transferred read and write rights in the machine controller operated in the master control mode. A method for operating such a filling line is also provided.

27 Claims, 9 Drawing Sheets

(51) Int. Cl.
  *B65B 3/26* (2006.01)
  *B65B 9/10* (2006.01)
(58) Field of Classification Search
  USPC .......................................... 700/231, 245–264
  See application file for complete search history.

(56) References Cited

U.S. PATENT DOCUMENTS

| | | | |
|---|---|---|---|
| 6,285,918 | B1 | 9/2001 | Kono |
| 6,745,103 | B1* | 6/2004 | McKillop .............. G06Q 10/00 |
| | | | 700/239 |
| 6,988,943 | B2* | 1/2006 | Reutter ............... A22C 13/0003 |
| | | | 452/40 |
| 7,258,604 | B2* | 8/2007 | Reutter ................ A22C 15/001 |
| | | | 452/30 |
| 7,524,240 | B2* | 4/2009 | Mueller .............. A22C 11/0209 |
| | | | 452/32 |
| 7,591,717 | B2* | 9/2009 | Bachtle .............. A22C 13/0003 |
| | | | 452/30 |
| 7,762,874 | B2* | 7/2010 | Schlieber ............ A22C 11/104 |
| | | | 452/47 |
| 8,543,233 | B2* | 9/2013 | Donati ............. G05B 19/41865 |
| | | | 700/96 |
| 8,561,375 | B2* | 10/2013 | Kiel ......................... A21C 3/10 |
| | | | 53/514 |
| 9,433,221 | B2* | 9/2016 | Bächtle .............. A22C 13/0013 |
| 9,668,492 | B2* | 6/2017 | Baechtle ............ A22C 13/0003 |
| 10,645,939 | B1* | 5/2020 | Brammall .............. B65G 17/24 |
| 11,641,861 | B2* | 5/2023 | Höhener ................ A23G 1/125 |
| | | | 426/231 |
| 12,030,080 | B2* | 7/2024 | Teufel ................. B05C 11/1039 |
| 2009/0130962 | A1* | 5/2009 | Willburger ......... A22C 11/0245 |
| | | | 452/31 |
| 2009/0165147 | A1* | 6/2009 | Jung ......................... H04L 9/40 |
| | | | 726/29 |
| 2010/0045684 | A1 | 2/2010 | Yamagami |
| 2010/0287879 | A1* | 11/2010 | Donati ............. G05B 19/41865 |
| | | | 53/52 |
| 2011/0045148 | A1* | 2/2011 | Kiel ......................... A21C 3/10 |
| | | | 99/450.2 |
| 2014/0287666 | A1* | 9/2014 | Baechtle ............ A22C 13/0006 |
| | | | 452/40 |
| 2015/0119217 | A1* | 4/2015 | Whittlesey .............. B65B 57/12 |
| | | | 493/24 |
| 2016/0207658 | A1 | 7/2016 | Bellante |
| 2019/0041842 | A1* | 2/2019 | Cella ...................... G06N 5/046 |
| 2020/0281218 | A1* | 9/2020 | Nicholson ............... B32B 27/34 |
| 2020/0346241 | A1* | 11/2020 | Teufel .................. A22C 7/0076 |
| 2021/0127701 | A1* | 5/2021 | Höhener .................. A23G 1/16 |
| 2023/0189824 | A1* | 6/2023 | Okubo ................... A21C 11/20 |
| | | | 426/496 |

FOREIGN PATENT DOCUMENTS

| | | |
|---|---|---|
| EP | 3045399 A1 | 7/2016 |
| EP | 3643178 A1 | 4/2020 |
| JP | 2008175718 A | 7/2008 |

OTHER PUBLICATIONS

Handtmann, Albert (Maschinenfabrik GmBh & Co), "ConPro system," Internet Citation, Aug. 6, 2013, pp. 1-12, XP002710032, www.handtmann.de/uploads/media/ConPro_System.pdf, 12 pages.
German Patent Office, Examination Report issued in DE 10 2022 115 961.2, dated Feb. 15, 2023 (5 pages).

* cited by examiner

FILLING LINE FOR PRODUCING FOODS MADE OF A PASTY MASS AND ASSOCIATED METHODS

CROSS-REFERENCE TO RELATED APPLICATION

This application claims priority to German Application No. DE 10 2022 115 961.2, filed Jun. 27, 2022. The above-mentioned patent application is incorporated herein by reference in its entirety.

TECHNICAL FIELD

This application relates to a filling line for producing foods made of a pasty mass, in particular stuffed foods, or foods stuffed into casings.

BACKGROUND

Such filling lines are generally known from the prior art. They include a combination of at least two filling machines and preferably also one or more front-end devices. Examples of front-end devices for use in filling lines include: casing holders for automatic twist linking of, for example, sausages; casing appliers; product shapers; conveying devices; hanging devices and portioning devices for producing balls or patties, for example. Two or more filling machines, in combination with such a front-end device, are used for various applications, such as so-called alginate applications in which a first filling machine conveys a pasty mass, and a second filling machine conveys an alginate gel which is used to encase the pasty masses. Two filling machines in combination with such a front-end device are also used in co-extrusion for the production of stuffed products, in which the first filling machine conveys the casing of the subsequent product and the second filling machine conveys the inner filling. Other applications for filling lines comprising two or more filling machines include post-portioning of pasty mass or product in order to correct the weight to the set weight. Applications of such filling lines comprising more than two filling machines include, for example, the production of foods having many different fillings, such as burritos. In this case, the different fillings are provided by different filling machines. Such filling lines and filling machines are not limited to the production of foods.

Joint operation of the first filling machine with one or more second filling machines within the filling line mostly requires precise adjustment and coordination of the two machines for joint operation. Recipe-relevant process parameters, in particular, are routinely adjusted and overwritten even after the machines or the filling line have been set up, or after the initialization of new recipes. Recipe-relevant process parameters include recipe numbers that are assigned to individual recipes and associated process parameters, speeds, target weights, target variables and options for hopper filling level detection, or vacuum, pressure and temperature controls. For example, the adjustment of one of the recipe-relevant process parameters at the first machine controller simultaneously requires the adjustment or overwriting of the recipe-relevant process parameters of the other machines in the filling line and that are associated with the modified process parameters. The partly iterative coordination of the machines within the filling line with each other necessitates continuous access not only to the first machine controller, but also to the second machine controller. At least one of the machine controllers in the filling line is often difficult for an operator to access, due to limited positioning options and the arrangement of the filling lines machines relative to each other as required by the production process.

Central controllers for controlling front-end devices and filling machines of a filling line are known from the prior art. The filling machines and additional front-end devices controlled by such a central controller cannot be operated without the latter, which means that their flexibility with regard to possible combinations of machines is severely limited.

Networked controllers of two or more filling machines, and in some cases further front-end devices of a filling line are also known, but they allow only rudimentary coordination of the machines with each other. Such coordination allows one of the two filling machines to be switched off, paused or started, for example, depending on the operating state of the other filling machine. Such assignment or ranking of the control function is also referred to as master/slave assignment.

It is also disadvantageous, especially since the accessibility of the first filling machine and of the second filling machine are dependent on the individual production environment, if, within the filling line, there is a fixed assignment of a higher-level control function, in the form of a fixed master/slave assignment to the two or more filling machines or to front-end devices. Such a previously fixed assignment precludes any flexible response to the spatial conditions prevailing in the respective production environment, which sometimes may also change.

In sum, however, the solutions known from the prior art do not allow precise coordination of all the recipe-relevant process parameters of the two or more filling machines when production starts, for example when the currently produced recipe changes, or continuously during production.

SUMMARY

Thus, it would be desirable to improve the flexibility of a filling line arrangement of the kind initially specified when there are limited positioning options in the production environment. At the same time, operation is to be improved and full control of at least the first filling machine and the second filling machine is to be ensured at all times, not only before the production process starts, but also during production. These and other technical objects and problems are addressed by the embodiments provided in this disclosure and invention.

In a first set of embodiments, the invention achieves the object specified above by a filling line according to the description below. In particular, the invention proposes that the first machine controller and the second machine controller are configured to be operated reciprocally either in a slave control mode or in a master control mode, depending on control information provided to the first machine controller and/or the second machine controller. The first machine controller and the second machine controller are configured in slave control mode to transmit read and write rights in respect of recipe-relevant process parameters to the machine controller operated in master control mode. In particular, the read and write rights are full read and write rights that allow full remote access to the recipe settings. In the recipe settings, different recipes are stored in the form of recipe-relevant process parameters. Such process parameters include, in particular, filling capacities, filling material pressure, filling material temperature, filling speed, filling acceleration, filling delay, portioning capacity, portioning length, portioning delay, filling drive load, weight group settings, recirculation volumes, target pressure, target temperature, feeder speed and feeder mode (cyclical, continuous, stirring), feeder startup and shutdown, acceleration, soft start and braking ramps. In the case of a vacuum filling machine, process parameters include further settings relating to the vacuum produced by the vacuum of the vacuum pump.

The first machine controller and the second machine controller are configured in master control mode to implement the transferred read and write rights. This transfer of read and write rights, i.e., the ability to fetch recipe-relevant process parameters using control communication and to overwrite them where necessary, enables the machine controller in master control mode to obtain full access to the machine controller in slave control mode. This transfer and implementation of the read and write rights advantageously obviates the need for spatial access to the machine controller in slave control mode, not only during recipe changes but also during operation.

The respective control variables for the functional modules of the first filling machine or the second filling machine are derived by the first and/or the second machine controller from the recipe-relevant process parameters. The functional modules include, for example, a drive unit for the feed screw, or a pump for the filling machine.

In other words, the filling line has a first filling machine and at least one further filling machine, both of which are configured not only for operation in master control mode with read and write rights, but also for operation in slave control mode, in which they have transferred their own read and write rights to the machine controller in master control mode. Depending on the options for positioning the filling line within the production environment, it can thus be decided on a case-by-case basis which of the two machine controllers can be reached better by an operator and is to be endowed according to needs with the appropriate read and write rights in master control mode. If the first filling machine or the second filling machine is disconnected in control engineering terms from the data interface, the two machines can then be operated on their own using their own machine controller, or in cooperation with other food processing machines, for example additional filling machines or front-end devices.

Such control information for a filling line according to the invention can be provided in different ways, as will be described in the preferred embodiments below. Such information can be provided, in particular, by a user interface, switches, plug-in or magnetic contacts, or by RFID. Such control information may take the form of control commands, control signals or software settings, for example.

Such machine controllers preferably include a storage medium in which all of the process parameters are stored in the recipe settings for the respective recipe. The stored recipe-relevant process parameters also depend on the respective combination of machines forming the filling line.

The first machine controller and the second machine controller are preferably configured in master control mode to calculate the control variables of the functional modules of the first filling machine and the second filling machine on the basis of the recipe-relevant process parameters and to control the functional modules directly. According to an alternative preferred embodiment, the machine controller is configured in master control mode to merely overwrite recipe-relevant process parameters and to transfer these changes to the machine controller in slave control mode. The first machine controller and the second machine controller in slave control mode are configured in that case to calculate control variables of their respective own functional modules on the basis of the transferred and overwritten process parameters.

The read and write rights preferably also include machine configurations and/or operating modes. One example of an operating mode relating to a filling machine is feed hopper loading, which can be done via a belt or hoist lifting device. Other operating modes include the operating mode depending on the combination of machines and in this regard include, in particular, filling, portioning, twisting off or also co-extrusion. Machine configurations also include temperature control, monitoring the feed hopper via filling level sensors and filling level modes, pre-cleaning the conveyor unit, feed hopper, vacuum venting time, vacuum thresholds for switching of the machine, or also settings for a vacuum hopper and the like. Machine settings for special control signals may also be provided, for example about the availability of, or production currently running on the respective filling machine, or settings for analog outputs of the respective filling machine, for example for downstream belts and metal detection settings. Settings for a separator valve or a separator of the second filling machine downstream in the production process can also be stored in the machine configurations. Control of the filling line is further optimized by the read and write rights of the machine controller operated in the master control mode. If need be, control of the filling line can now be fully adjusted and overwritten solely by a machine controller operated in master control mode, also with regard to the machine configurations and operating modes. Some of the machine configurations and operating modes also have direct influence on the food product being produced, and these can therefore be combined with the recipe-relevant process parameters as so-called recipe parameters. The settings for a separator valve are an example of such machine configurations. The invention allows full access to all the recipe parameters. Furthermore, accessing the machine configurations enhances the security of the system, also with regard to any monitoring functions such as monitoring the feed hopper via filling level sensors.

It is further preferred that the read rights include condition monitoring of the respective filling machine operated in slave control mode, and/or process monitoring of the entire filling line. Condition monitoring allows current information relating to the process on the respective machine to be captured with the aid of sensors that are already integrated or that need to be retrofitted. This does not always require an upgrade of existing machines, since even power consumption data can be used to acquire information for condition monitoring. Any information with which a deviation from the desired process can be registered is of interest in this regard. Examples of such information are fluctuations in temperature, in the consumption of power and operating supplies, as well as fluctuations in natural oscillations or flow rates. Process monitoring relates to the capturing of data along the entire production chain of the filling line. It also consists in monitoring the power consumption and the consumption of foods to be processed, the machine load factor and the availability of the foods to be processed.

It is further preferred that the machine controllers in master control mode are each configured by the condition monitoring and/or the process monitoring to receive and to process diagnostic data and/or error messages from the machine controller in slave control mode. Due to full monitoring of the machine operated in slave control mode, there is no necessity to access the machine controller in slave control mode, even in the event of malfunctions. All data relevant for diagnosis are transmitted via the data interface from the machine controller in slave control mode to the machine controller in master control mode. The machine controller in master control mode thus provides a user with full remote access to the machine operated in slave control mode. By appropriately processing the received diagnostic data and/or error messages, the machine controller in master control mode is able in particular to switch off the filling machine operated in slave control mode, if the need arises, or to change or overwrite recipe-relevant process parameters, machine configurations or operating modes accordingly. This means the machine controller in master control mode is also able to temporarily pause operation of the entire filling line or of the filling machines on their own, for example to replenish the synthetic or natural gut casing. Such diagnostic data are time-critical signals, so operation is improved by fast data communication.

It is particularly preferred that the data interface is configured for real time data transmission between the first machine controller and the second machine controller. In particular, the data interface includes a CAN bus and a bus line, and/or an EtherCAT fieldbus, an Ethernet line and/or an Ethernet connection, in particular an Ethernet IP, and a potential-free contact, a Modbus, a Profibus, RS-232, EIB/KNX and DMX. According to the definition of DIN 44300, which has since been replaced by the DIN ISO/IEC2382 standard in English, real time data transmission is understood to mean the operation of a computing system in which programs for processing generated data are operational such that the results of processing are available within a specified period of time. Depending on the specific application, the data may be generated according to a random distribution, or at predetermined times. Within a filling line, real time data transmission according to the invention allows the machine operated in master control mode to respond within a few milliseconds or seconds to states of the filling machine operated in slave control mode. Realtime data transmission thus makes it possible to respond during ongoing operation to a state of the machine in slave control mode, for example by adjusting or overwriting recipe-relevant process parameters, in particular. This response time is determined by the low-latency and low-distortion transmission speed of the data interface.

According to a preferred embodiment, the control information is a first control information indicating target operation in master control mode, with a second control information indicating target operation in slave control mode. The respective target operation is thus indicated to the first machine controller and the second machine controller by providing first control information and second control information. The first control information is preferably provided by the first machine controller, and the second control information is preferably provided by the second machine controller. Each of the two machine controllers is thus provided with its own control information, and the machine controllers are configured to switch into a control mode corresponding to the target mode of operation when said control information is received.

According to a preferred embodiment, the data interface has at least a first slot and a second slot, with the control information being assigned to the first slot. The data interface preferably comprises a CAN bus that includes the slots or that cooperates with the slots. The first control information is preferably assigned to the first slot and the second control information to the second slot. It is thus possible, by selecting the respective slot, to determine which of the machine controllers is to be operated in master control mode and which in slave control mode. This assignment can be specified in a flexible manner and according to needs, given the available positioning options in the production environment.

According to a preferred development of the invention, the data interface has a storage medium for storing the assignment of the control information to the first slot and is configured to provide and transmit the control information to the machine controller which is connected to the first slot. If the first control information is assigned to the first slot and the second control information is assigned to the second slot, the storage medium is configured to store the assignment of the first control information to the first slot and the assignment of the second control information to the second slot. The data interface is also configured to provide and transmit the first control information to the machine controller connected to the first slot and to transmit the second control information to the machine controller connected to the second slot. Due to this functional integration with regard to the data interface, control communication between the first machine controller and the second machine controller is thus ensured, and at the same time the target operation in master control mode and in slave control mode is assigned to the two machine controllers by the data interface.

Second control information indicating the ability of the respective machine controller to operate in slave control mode is preferably also assigned to the first machine controller and/or the second machine controller. After receiving the first control information, the first machine controller and/or the second machine controller are configured to be operated in master control mode and to have read and write rights in the event that the second machine controller connected via the data interface is assigned such second control information. Such second control information may be stored, for example, in operating software of the respective machine controller, or may be provided by manual input, for example by a keyboard.

In the case of a CAN bus, control information can be provided by the data interface via one or more master nodes of a multi-master bus. A multi-master bus requires centralized or decentralized communication that ensures that only one master node has control of the bus at any given time. Such a master node, also called the active node or the master node, is configured to independently initiate a communication procedure on the bus. It is possible by such a communication procedure to provide the control information assigned to the respective slots, for example.

According to another preferred further development of the invention, the first machine controller and the second machine controller each have a scanning function and are configured to retrieve the control information assigned to the slot, or to the further machine controller respectively connected via the data interface, when connected to the data interface. Such assignment of the control information to the slots can be done, for example, by identifying the slot via the respective data interface. In embodiments in which the first machine controller and the second machine controller each have a scanning function, they can communicate in the case of a CAN bus connection with passive nodes of the data interface, which are also referred to as slave nodes. The latter are configured, for example, to reply to queries via such a scanning function. The respective response may include, for example, control information assigned to a slot or a machine controller. In particular, a node address or node ID is assigned to the machine controller intended for operation in slave control mode. This assignment is performed according to the respective slot, for example. Via the scanning function, the machine controller in master control mode then inquires after the new node IDs or after a specific node ID indicating target operation in slave control mode.

According to another preferred development of the invention, the filling line further comprises a computer program and a processor for running the computer program, which is connected to the first machine controller and/or the second machine controller. The processor is configured to provide at least the first control information to the first machine controller and/or to the second machine controller when running the computer program. In this case, the control information is a control signal, in particular. Such a processor may also be integrated in the first machine controller and/or in the second machine controller. In a filling line that has a processor, it is thus possible for control information to be provided to the first machine controller and/or to the second machine controller by an appropriate computer program and by running said computer program. This control information then indicates a target operation of the machine controllers, the machine controllers being configured to be operated reciprocally in either master control mode or in slave control mode on receiving said control information.

Each of the first machine controller and the second machine controller are preferably also configured, by a/the scanning function, to retrieve a slot occupancy via the data interface and in the event that the first slot and the second slot are occupied, to switch into master control mode or into slave control mode, depending on the control information. In that case only, the two machine controllers thus switch into master control mode or into slave control mode in such advantageous manner that a respective machine controller is also connected to the data interface for each of the target control modes. Thus, if the slot occupancy differs—for example the first and the fourth slots are occupied—the connection via the data interface to conventional operation is still possible via the respective own machine controller of the first filling machine and the second filling machine.

According to a preferred embodiment, the first filling machine has a first control panel and the second filling machine has a second control panel. The first machine controller and the second machine controller can thus be operated independently of each other using the control panel in individual operation. The machine controllers are each preferably configured to deactivate the control panel of the machine controller being operated in slave control mode. This protects the machine controller operated in slave control mode against unauthorized access.

The first control panel is preferably configured to provide control information, in particular the first control information, to the first machine controller by manual input. It is further preferred that the second control panel is configured to provide control information, in particular the first control information, to the second machine controller by manual input. The respective control information can thus be provided advantageously not only via the first control panel, but also via the second control panel. In this case, the control information is a manual control command, in particular. It is preferable that the second control information can also be provided by manual input via the respective control panel.

The first machine controller and the second machine controller are preferably also configured to provide the second control information in master control mode. In this case, the second control information is a control signal, in particular. It thus suffices to provide only the first control information to the first machine controller or to the second machine controller, which is configured to provide the second control information, in response to this first control information, to the machine controller operating reciprocally in slave control mode. It should be understood that the respective machine controller itself does not yet have to be operated actively in master control mode, but has received the respective control information and is thus informed that its target control mode is the master control mode. In some embodiments, the first machine controller and the second machine controller are then configured to initially retrieve, via a scanning function, a second slot occupancy or basically an assignment of the second control information indicating target operation in slave control mode, and to be operated in master control mode. If only a second slot assignment is retrieved, the first machine controller and the second machine controller are then configured to provide the second control information.

According to a preferred embodiment, the filling line is configured to produce stuffed food products in a co-extrusion process. By operating filling lines with two filling machines in a co-extrusion process, it is particularly important to coordinate the filling machines with regard to recipe-relevant process parameters. For example, the first filling machine provides the filling material for the casing, and the second filling machine provides the filling material for the core. A change in the process parameters of the first filling machine simultaneously necessitates a change in the recipe-relevant process parameters of the second filling machine. If there is a change in the portion weight of the filling material for the core, then the portion weight of the filling material for the casing must also be adjusted at the same time. The adjustment or overwriting of the recipe-relevant process parameters, which is closely coordinated at all times, makes it particularly necessary to have full access to all the recipe-relevant process parameters of the machine controller being operated in slave control mode.

According to a preferred development of the invention, the filling line further comprises n front-end device having a third machine controller, which is in control communication with the first machine controller and with the second machine controller via the data interface. In the case, for example, of portioning devices being operated as front-end devices, recipe-relevant process parameters also include the portioning volume, the portion shape and the portioning speed. In the case of clipping machines being operated as front-end devices, recipe-relevant process parameters also include the clipping time or also the clip position. If one of the filling machines is operated jointly with a cutting device, recipe-relevant process parameters also include the blade speed.

The third machine controller is preferably configured to be operated in slave control mode when there is a control communication via the data interface, with the mode of operation depending on the control information provided. Two of the three machine controllers are always operated in slave control mode in this case. Thus, by transferring read and write rights, it is also possible to coordinate closely the operation of the front-end device with the operation of the first filling machine and the second filling machine. For example, all the recipe-relevant process parameters of the front-end device, the first filling machine and the second filling machine can then be fetched and overwritten via the first machine controller. Diagnostic processes regarding the first filling machine, the second filling machine and the front-end device can also be carried out by the first machine controller. It is thus possible to further improve the controllability and operation of the filling line as a whole.

According to another preferred embodiment, the front-end device can also be configured to operate independently of the first filling machine and the second filling machine. Such close coordination, as is the case with two filling machines in the co-extrusion process, for example, is not absolutely necessary for a front-end device. Front-end devices for passing on or for dispensing the food produced by the filling line are mostly arranged more accessibly, so remote access to the machine controller is not necessary.

According to another preferred development of the invention, the first filling machine and the second filling machine each have a display unit that cooperates with the machine controller and the control panel. The display unit is preferably configured in master control mode to display the implemented read and write rights as well as the read and write rights of the machine controller in master control mode. This further simplifies the operability of the filling line.

The first machine controller and the second machine controller, in particular the third machine controller also, are configured in master control mode to identify, when a first recipe-relevant process parameter is overwritten or changed, all of the recipe-relevant process parameters associated with the overwritten first recipe-relevant process parameter and to adjust them correspondingly to the first recipe-relevant process parameter. The recipe-relevant process parameters associated with the first recipe-relevant process parameter can be assigned to the first filling machine and the second filling machine, as well as to further front-end devices if necessary. Coordination of food production by the filling machine as a whole is thus optimized. If, for example, the portion weight of the filling material for the core is reduced, then the portion weight of the filling material for the casing is also reduced in the same manner. The speed of a front-end device that receives and conveys the portioned foods, for example, can also be adjusted according to the changed portion size.

A first set of embodiments of the invention relating to a filling line has been described above. According to a second set of embodiments, the invention achieves the initially specified object by a method for operating a filling line, in particular a filling line according to the first set of embodiments of the invention. The method for operating a filling line includes the steps of: a) connecting a first machine controller of a first filling machine to a data interface for control communication, b) connecting a second machine controller of a second filling machine to the data interface for control communication, c) providing control information to the first machine controller and/or the second machine controller, initializing a first target control mode in the first machine controller and a second target control mode in the second machine controller, depending on the control information provided, wherein the two target control modes include a master control mode and a slave control mode, wherein the initialization of the slave control mode includes transmitting read and write rights, in particular full read and write rights in respect of recipe-relevant process parameters, to the machine controller operated in the master control mode, and the initialization of the master control mode includes implementing the transferred read and write rights in the machine controller operated in master control mode, e) reciprocally operating the first machine controller and the second machine controller either in a master control mode or in a slave control mode, comprising the steps of fetching and overwriting the recipe-relevant process parameters of the first filling machine and the second filling machine by the machine controller in master control mode.

By initializing a first target control mode and a second target control mode according to the control information provided, and due to the resultant reciprocal operation of the machine controllers either in master control mode or in slave control mode, the method utilizes the advantages described above with reference to the filling line. Advantages and preferred embodiments described with reference to the first set of embodiments are also advantages and preferred embodiments of the second set of embodiments, and vice versa.

According to a preferred embodiment of the method, the read rights include condition monitoring of the first filling machine or second filling machine operated in slave control mode, and/or process monitoring of the entire filling line. Operating the first machine controller or second machine controller in master control mode further includes the steps of: f) diagnostic data and/or error messages from the machine controller in slave control mode being received and processed by the condition monitoring and/or the process monitoring, g1) switching off the first or second filling machine in slave control mode, or g2) stopping the first or second filling machine in master control mode and/or in slave control mode, g3) adjusting recipe and produce parameters in the product and recipe settings by using the read and write rights, and/or g) adjusting process parameters in the process setting by using the read and write rights. This can prevent damage to the food or the filling machine by switching off or stopping the machine on receiving and after processing the relevant diagnostic data and/or error messages. Furthermore, the receiving and processing of diagnostic data and/or error messages by the condition monitoring or process monitoring also allows the adjustment of recipe-relevant process parameters, which are stored as recipe settings in a storage device, in particular. In master control mode, the machine controller thus has full access, also with regard to the condition monitoring or process monitoring, and thus to in-depth diagnostic data and diagnostic functions.

According to another preferred embodiment, the data interface has at least a first slot and a second slot, the control information being assigned to the first slot. The providing of control information in step c) also includes transmission of the control information by the data interface when connected to the first slot, or retrieval of the control information assigned to the first slot by a scanning function of the first machine controller and the second machine controller. This allows the target operating mode of the filling machines to be assigned in a simple manner according to the slot occupancy of the data interface. Transmission by the data interface allows this to be done in a simple manner via a master node of a CAN bus connection. Alternatively, the control information can be transmitted by using a scanning function to retrieve the control information assigned to the first slot. In the case of a CAN bus connection, the scanning function scans a passive node for a corresponding signal.

According to an alternative embodiment, providing the control information in accordance with step c) comprises providing the control information at the first machine controller and/or the second machine controller by manual input via a control panel. The respective control information can thus be provided directly by an operator via a user interface, if need be.

The control information is preferably first control information indicating target operation in the master control mode, wherein the providing of control information in accordance with step c) further comprises the providing of second control information indicating target operation in slave control mode. This information is preferably provided by the machine controller operating or to be operated in master control mode. Their respective target operation is thus indicated to the first machine controller and the second machine controller by providing them with first control information and second control information. The first control information is preferably provided by the first machine controller, and the second control information is preferably provided by the second machine controller. Each of the two machine controllers is thus provided with its own control information, and the machine controllers are configured to switch into a control mode corresponding to the target mode of operation when said control information is received.

According to a preferred embodiment, the read and write rights also include machine configurations and/or operating modes, wherein operation of the first machine controller or the second machine controller in master control mode in accordance with step e) further comprises the steps of the machine configurations and/or the operating modes being fetched and overwritten by the machine controller operating in master control mode. Control of the filling line is further optimized by the read and write rights of the machine controller operated in the master control mode. Control of the filling line can now be fully adjusted and overwritten, if necessary, solely by the machine controller operated in master control mode, also with regard to the machine configurations and operating modes.

BRIEF DESCRIPTION OF THE DRAWINGS

Further advantages, features and possible applications of the present invention will be apparent from the following detailed description in connection with the drawings. The accompanying drawings, which are incorporated in and constitute a part of this specification, illustrate one of more embodiments of the invention and, together with the general description given above and the detailed description given below, explain the one or more embodiments of the invention.

DETAILED DESCRIPTION

Figure 1:
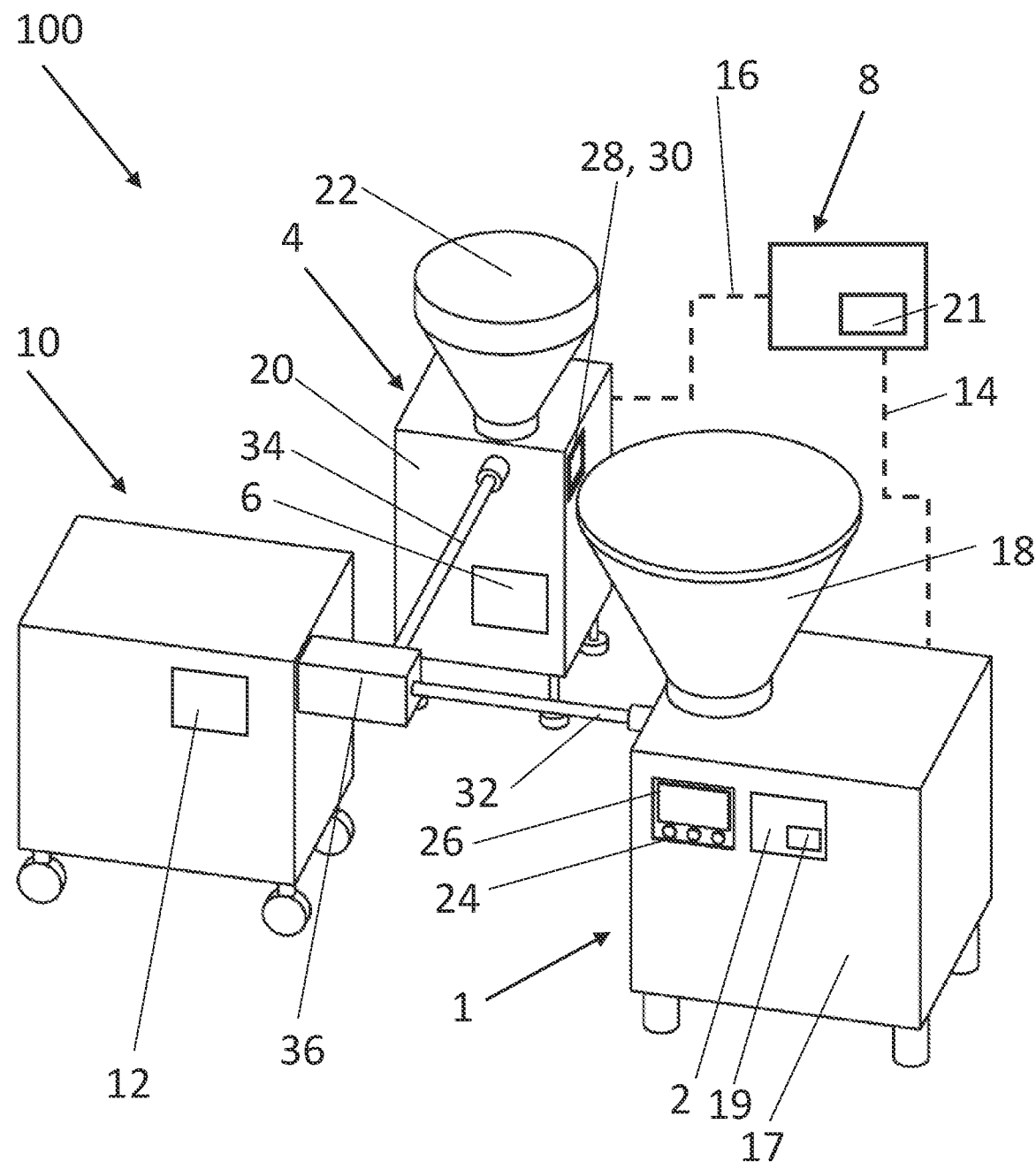
FIG. 1 is a perspective view of a filling line according to a first embodiment.

Filling line 100 as shown in FIG. 1 comprises a first filling machine 1 having a first machine controller 2, and a second filling machine 4. The second filling machine 4 includes a second machine controller 6. The first filling machine 1 and the second filling machine 4 are operable not only in cooperation with each other, but also independently of each other.

Filling line 100 also includes a data interface 8 by which the first filling machine 1 and the second filling machine 4 are connected to each other for control communication.

Filling line 100 preferably also comprises a further food processing machine in the form of a front-end device 10. Front-end device 10 is a separator, for example. Front-end device 10 preferably has its own third machine controller 12 and is thus operable not only in cooperation with the first filling machine 1 and the second filling machine 4, but also independently of them.

The first filling machine 1 is connected to data interface 8 via a first data line 14. The second filling machine 4 is connected to data interface 8 via a second data line 16. Data lines 14, 16 are wired lines, in particular, that allow reliable data transmission in any production environment. The first data line 14 and the second data line 16 are configured for real time data transmission, data lines 14, 16 being bus lines or Ethernet lines, for example. Data interface 8 is preferably provided, accordingly, either as a CAN bus or as an EtherCAT fieldbus.

The first filling machine 1 comprises a housing 17 and a feed hopper 18 that is preferably mounted pivotably on housing 17. The first machine controller 2 has a scanning function 19, and data interface 8 has a storage medium 21 for storing the assignment of control information S1. Scanning function 19 is configured to retrieve the information stored in storage medium 21.

The second filling machine 4 analogously comprises a housing 20 and a feed hopper 22 that is preferably mounted pivotably on housing 20. Preferably, the second machine controller 6 also has a scanning function that is not shown here.

The first filling machine 1 further comprises a control panel 24 and a display unit 26 assigned to control panel 24. The first control panel 24 and the first display unit 26 are in control communication with the first machine controller 2.

The second filling machine 4 likewise comprises a control panel 28 and a display unit 30 assigned to control panel 28. The second control panel 28 and the second display unit 30 are in control communication with the second machine controller 6.

Filling line 100 is configured, in particular, to produce stuffed foods made of a pasty mass in a co-extrusion process. However, it should be understood that the invention is not limited to filling lines for the co-extrusion process.

The first filling machine 1 has a first filling tube 32, and the second filling machine 4 has a second filling tube 34. The first filling machine 1 takes over the task of portioning, via the first filling tube 32, the filling material intended for the casing, and the second filling machine 4 takes over the task of portioning the filling material intended for the core. The filling material is a pasty mass. Front-end device 10 has a shaping module 36 that is connected to the first filling tube 32 and the second filling tube 34. Front-end device 10 is configured by shaping module 36 to bring together the filling material for the core and for the casing and to dispense a continuous strand, for example. Here, front-end device 10 is preferably embodied as a separator and is also configured to provide portions of the stuffed food, rather than a continuous strand, by separating the continuous strand.

As can be seen from FIG. 1, the control panel 24 of the first filling machine 1 is easy to access, whereas access to the control panel 28 of the second filling machine 4 is made more difficult by the path of filling tubes 32, 34 and by the placement of front-end device 10. This is where the invention comes in and enables remote access to the second machine controller 6 by the first machine controller 2.

Figure 2A:
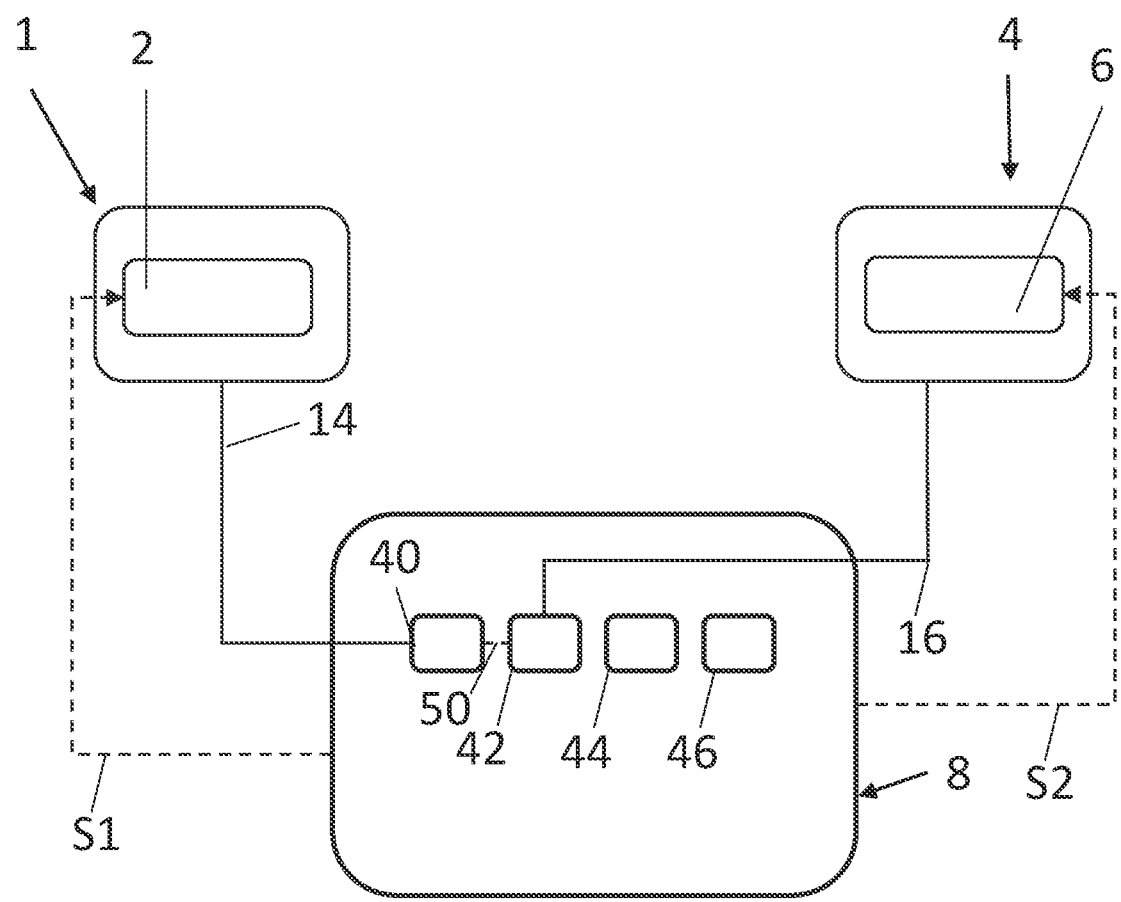
FIG. 2a is a schematic sketch of a first embodiment of a data line for the filling line in FIG. 1.

As shown in FIG. 2a, the control communication between the first filling machine 1 and the second filling machine 4 via data interface 8 allows the first machine controller 2 and the second machine controller 6 to be operated in two different control modes by providing at least one control information S1, S2. The target control modes include a master control mode and a slave control mode. Operation in slave control mode causes read and write rights regarding recipe-relevant process parameters to be transferred to the machine controller operated in master control mode. The machine controller operated in master control mode is configured, for its part, to implement the transferred read and write rights so that one of the two machine controllers 2, 6 has access to the recipe-relevant process parameters of the two machine controllers 2, 6 and has the respective read and write rights. FIG. 2a shows data interface 8 with a total of four slots 40, 42, 44, 46. The first machine controller 2 is connected to the first slot 40. The second machine controller 6 is connected to the second slot 42. Data interface 8 is configured here to provide first control information S1 indicating target operation in master control mode. First control information S1 is assigned here to the first slot 40, such that data interface 8 provides control information S1 to the first machine controller 2 when the first machine controller 2 is connected to the first slot 40.

Data interface 8 is also configured to provide second control information S2 indicating target operation in slave control mode. The second control information S2 is assigned to the second slot 42, so data interface 8 is configured to provide the second control information S2 to the second machine controller 6 when the second machine controller 6 is connected to the second slot 42. The first control information S1 is provided here via a first data line 14, and the second control information S2 is provided via a data line 16.

At least the first slot 40 and the second slot 42 are in control communication with each other via a first signal connection 50. Recipe-relevant process parameters are provided in real time by the second machine controller 6 in slave control mode to the first machine controller 2 via the first data line 14, the second data line 16 and the first signal connection 50, not only before production begins, but also continuously during ongoing production.

After receiving first control information S1 indicating target operation in master control mode, the first machine controller 2 is preferably configured to retrieve the occupancy of other slots 42, 44, 46 by a scanning function 19 (cf. FIG. 1).

In preferred embodiments, the first machine controller 2 is also configured in master control mode to perform either condition monitoring of the second filling machine 4, or process monitoring of the entire filling line 100 (cf. FIG. 1). In this context, the first machine controller 2 is also configured, in particular, to receive and process diagnostic data and/or error messages from the second machine controller 6. Depending on these processed diagnostic data and/or error messages, the first machine controller 2 is configured to stop or switch off the second filling machine 4, or to adjust recipe-relevant process parameters if need be.

Figure 2B:
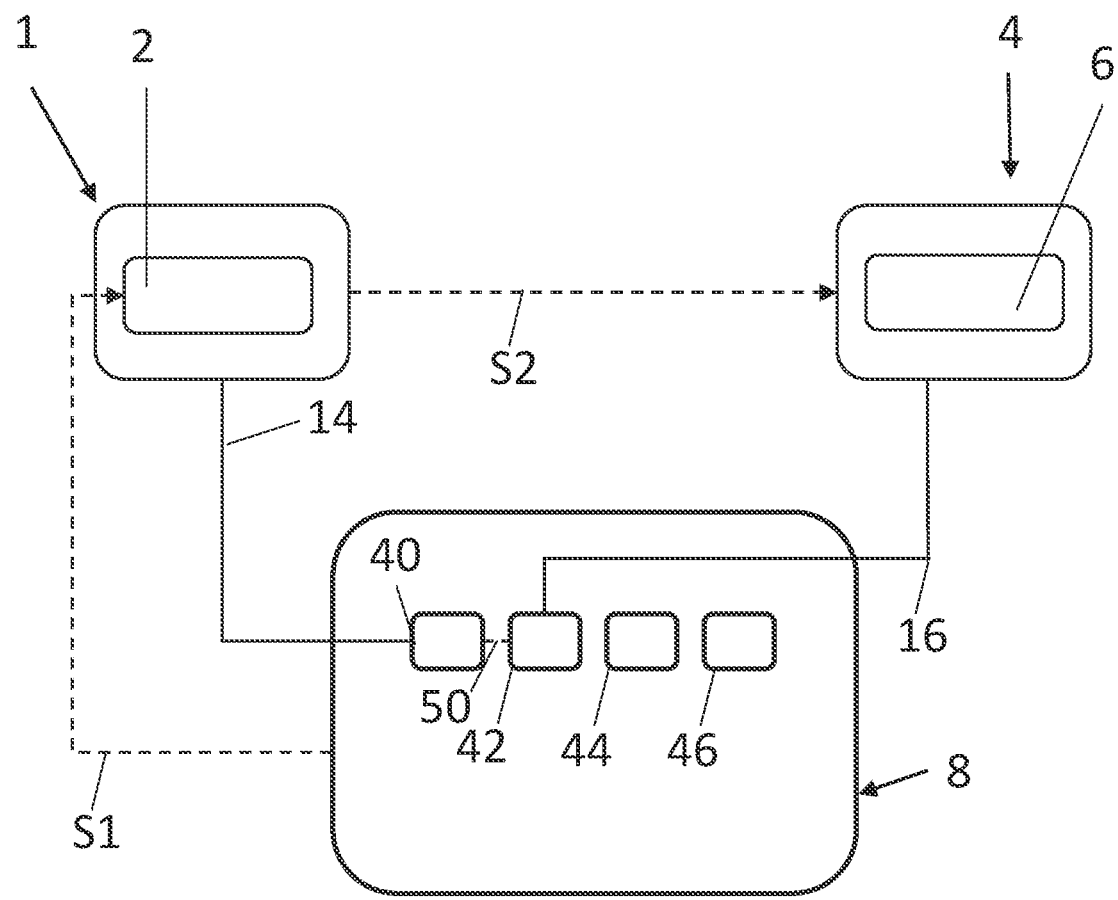
FIG. 2b is a schematic sketch of a second embodiment of a data line for the filling line in FIG. 1.

FIG. 2b shows a schematic sketch of the data transmission of the filling line shown in FIG. 1, according to a second embodiment. The same or similar units have identical reference signs in FIGS. 2a and 2b. Reference is made in full to the description of the embodiment in FIG. 2a, and only the differences between the embodiments are discussed in detail below.

The embodiments in FIGS. 2a and 2b differ in the way that second control information S2 is provided. In both embodiments, first control information S1 is provided in a known manner by the data interface 8 of the first machine controller 2. The first machine controller 2 according to FIG. 2b is then configured to provide second control information S2 to the second machine controller 6. Here, this second control information S2 indicates target operation in slave control mode. Second control information S2 can be provided by the first machine controller 2 not only via data lines 14, 16 and data interface 8, but also wirelessly via a Bluetooth connection or a radio link between the first machine controller 2 and the second machine controller 6.

Figure 3:
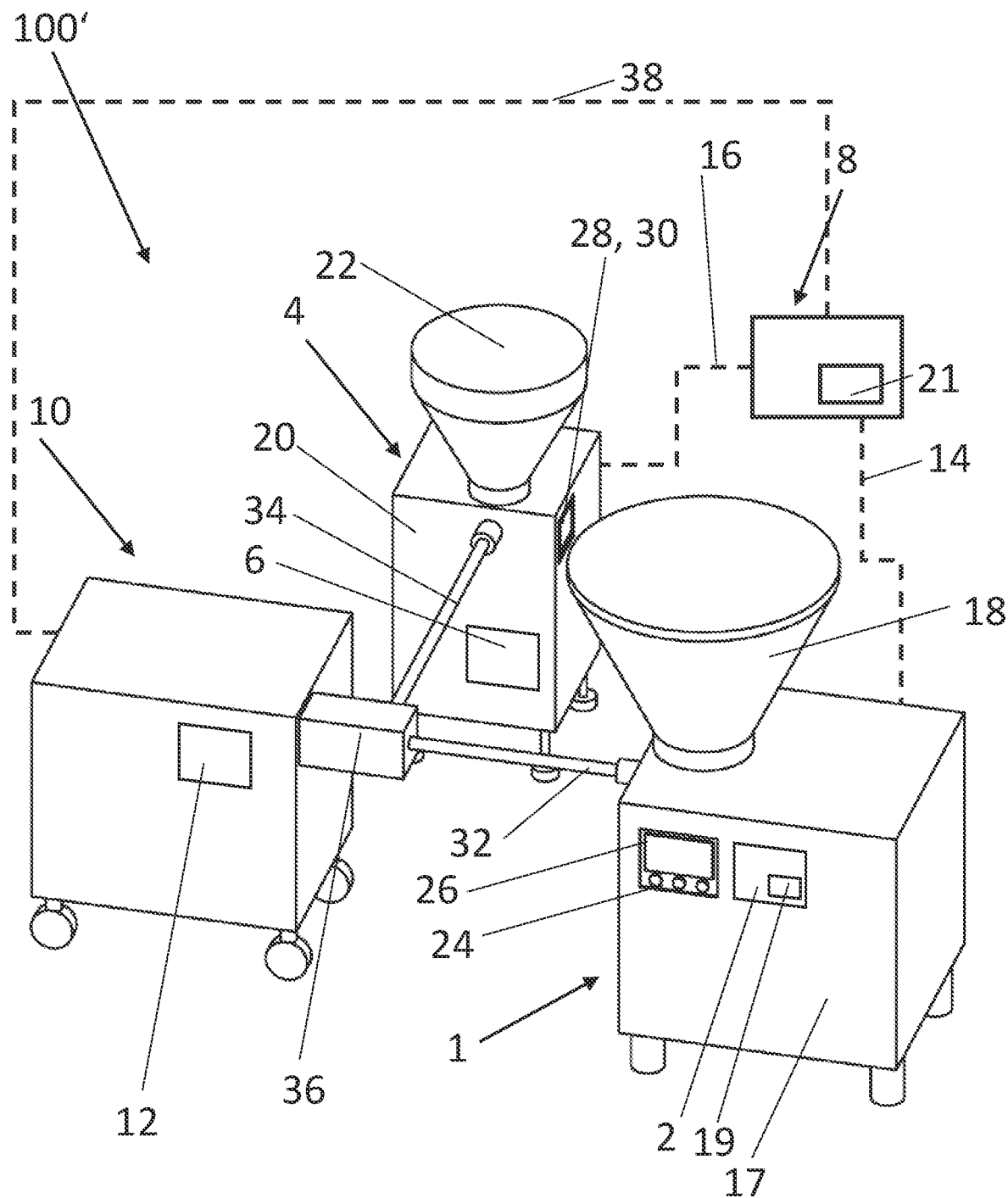
FIG. 3 is a perspective view of a filling line according to a second embodiment.

Referring now to the embodiment of filling line 100' shown in FIG. 3, the same or similar components or units have identical reference signs in FIGS. 1 and 3.

Filling line 100' comprises, in a manner known from the prior art, a first filling machine 1 having a first machine controller 2, and a second filling machine 4. The second filling machine 4 includes a second machine controller 6. The first filling machine 1 and the second filling machine 4 are operable not only in cooperation with each other, but also independently of each other.

Filling line 100' also has a data interface 8 by which the first filling machine 1 and the second filling machine 4 are connected to each other for control communication.

Filling line 100' also comprises a further food processing machine in the form of an front-end device 10. Front-end device 10 is a separator, for example. Front-end device 10 preferably has its own third machine controller 12 and is thus operable not only in cooperation with the first filling machine 1 and the second filling machine 4, but also independently of them.

The first filling machine 1 is connected to data interface 8 via a first data line 14. The second filling machine 4 is connected to data interface 8 via a second data line 16. Data lines 14, 16 are wired lines, in particular, which allow reliable and robust transmission of data. The first data line 14 and the second data line 16 are configured for real time data transmission, data lines 14, 16 being bus lines or Ethernet lines, for example. Data interface 8 is preferably provided, accordingly, either as a CAN bus or as an EtherCAT fieldbus.

The first filling machine 1 comprises, in a manner known from the prior art, a housing 17 and a feed hopper 18 that is preferably mounted pivotably on housing 17. The first machine controller 2 has a scanning function 19, and data interface 8 has a storage medium 21 for storing the assignment of control information S1.

The second filling machine 4 analogously comprises a housing 20 and a feed hopper 22 that is preferably mounted pivotably on housing 20. Preferably, the second machine controller 6 also has a scanning function that is not shown here.

The first filling machine 1 further comprises a control panel 24 and a display unit 26 assigned to control panel 24. Control panel 24 and display unit 26 are in control communication with the first machine controller 2.

The second filling machine 4 likewise comprises a control panel 28 and a display unit 30 assigned to control panel 28. Control panel 28 and display unit 30 are is control communication with the second machine controller 6.

Filling line 100' is configured, in particular, to produce stuffed foods made of a pasty mass in a co-extrusion process.

The first filling machine 1 has a first filling tube 32, and the second filling machine 4 has a second filling tube 34. Front-end device 10 has a shaping module 36 which is connected to the first filling tube 32 and to the second filling tube 34 and which is configured to combine the pasty mass intended for the casing and the pasty mass intended for the core to form a stuffed food and to dispense a continuous strand, for example. Here, front-end device 10 is preferably embodied as a separator and is also configured to provide portions of the stuffed food, rather than a continuous strand, by separating the continuous strand.

As can be seen from FIG. 3, the control panel 24 of the first filling machine 1 is easy to access, whereas access to the control panel 28 of the second filling machine 4 is made more difficult by the path of filling tubes 32, 34 and by the placement of front-end device 10.

Data interface 8 is also configured to connect front-end device 10 for control communication to the first filling machine 1 and the second filling machine 4 when there is a third data line 38.

Figure 4A:
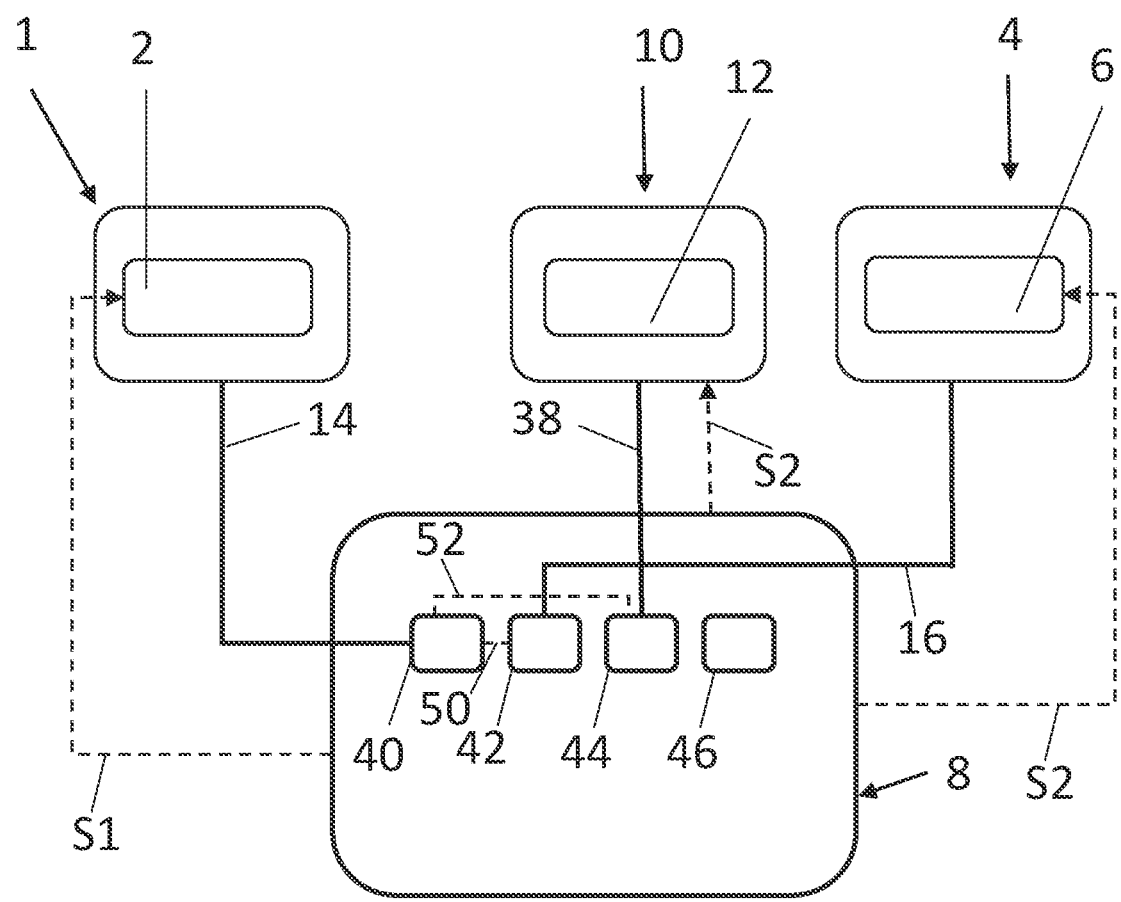
FIG. 4a is a schematic sketch of a first embodiment of a data line for the filling line in FIG. 3.

As shown in the schematic sketch of the data transmission of filling line 100' (cf. FIG. 3) as shown in FIG. 4a, the control communication connection between the first filling machine 1 and the second filling machine 4 via data interface 8 allows machine controllers 2, 6 to be operated in two different target control modes by providing at least one control information S1, S2. The target control modes include the master control mode and slave control mode described above.

FIG. 4a shows data interface 8 with a total of four slots 40, 42, 44, 46. The first machine controller 2 is connected to the first slot 40. The second machine controller 6 is connected to the second slot 42. The third machine controller 12 is connected to the third slot 44 via a third data line 38. Data interface 8 is configured here to provide first control information S1 indicating target operation in master control mode. First control information S1 is assigned here to the first slot 40, such that data interface 8 provides control information S1 to the first machine controller 2 when the first machine controller 2 is connected to the first slot 40.

Data interface 8 is also configured to provide second control information S2 indicating target operation in slave control mode. The second control information S2 is assigned to the second slot 42, so data interface 8 is configured to provide the second control information S2 to the second machine controller 6 when the second machine controller 6 is connected to the second slot 42. The first control information S1 is provided here via a first data line 14, and the second control information S2 is provided via a data line 16.

Furthermore, data interface 8 is configured to provide second control information S2—i.e., the signal indicating target operation in slave control mode—also to the third machine controller 12 of front-end device 10. The second control information S2 is also assigned to the third slot 44, in addition to the second slot 42, so data interface 8 likewise provide second control information S2 when the third machine controller 12 is connected to the third slot 44.

The first slot 40 and the second slot 42 are in control communication with each other via a first signal connection 50. The first slot 40 and the third slot 44 are in control communication with each other via a first signal connection 52. Recipe-relevant process parameters are provided in real time by the second machine controller 6 in slave control mode to the first machine controller 2 via data lines 14, 16, 38 and signal connections 50, 52. The parameters are preferably provided before production starts and also during ongoing operation.

After receiving first control information S1 indicating target operation in master control mode, the first machine controller 2 is preferably configured to retrieve the occupancy of other slots 42, 44, 46 by a scanning function 19.

In preferred embodiments, the first machine controller 2 is also configured in master control mode to perform either condition monitoring of the second filling machine 4 and/or of front-end device 10, or process monitoring of the entire filling line 100' (cf. FIG. 3). In this context, the first machine controller 2 is also configured, in particular, to receive and process diagnostic data and/or error messages from the second machine controller 6 and from the third machine controller 12. Depending on these processed diagnostic data and/or error messages, the first machine controller 2 is configured to stop or switch off the second filling machine 4 and front-end device 10, or to adjust recipe-relevant process parameters if need be.

Figure 4B:
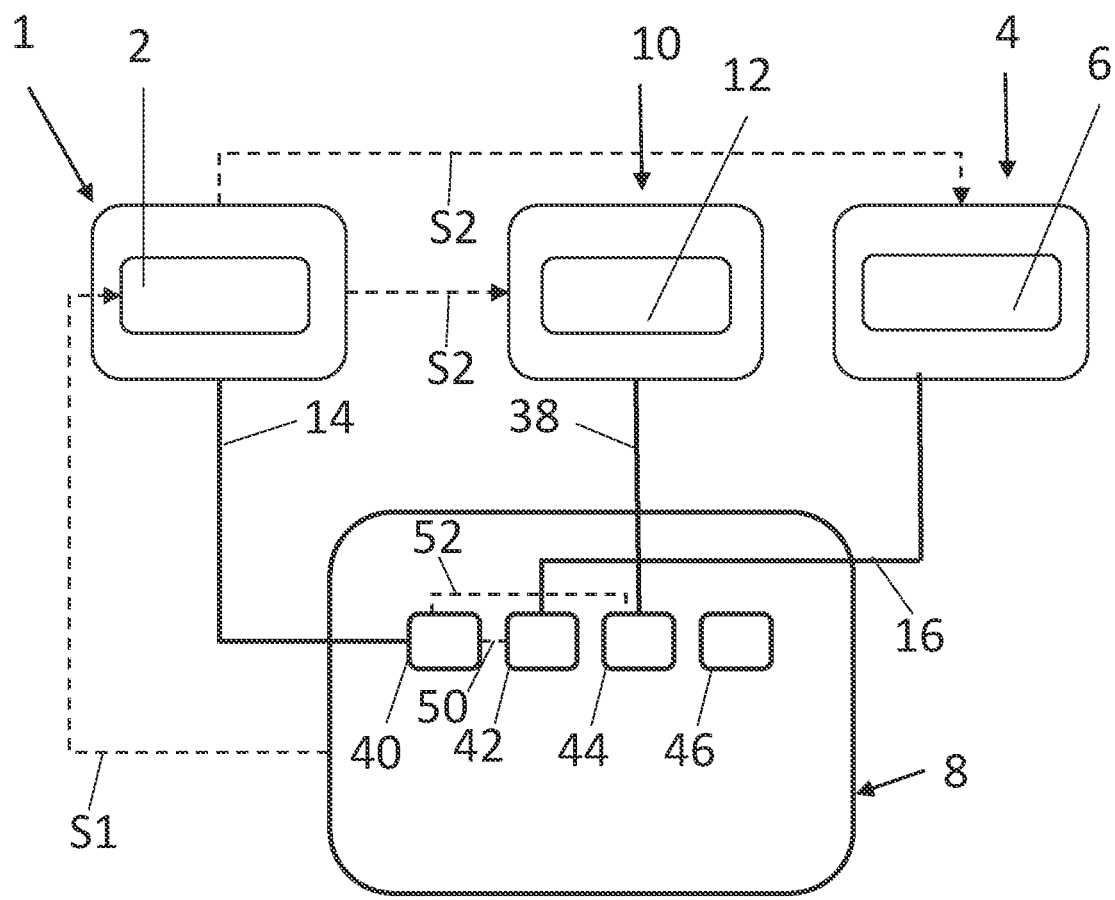
FIG. 4b is a schematic sketch of a second embodiment of a data line for the filling line in FIG. 3.

FIG. 4b shows a schematic sketch of the data transmission of filling line 100' (cf. FIG. 3) according to a second embodiment. The same or similar units have identical reference signs in FIGS. 4a and 4b. Reference is made in full to the description of the embodiment in FIG. 4a, and only the differences between the embodiments are discussed in detail below.

The embodiments in FIGS. 4a and 4b differ in the way that second control information S2 is provided. In both embodiments, first control information S1 is provided by the data interface 8 of the first machine controller 2. The first machine controller 2 according to FIG. 4b is then configured to provide second control information S2 to the second machine controller 6 and to the third machine controller 12. Here, this second control information S2 indicates target operation in slave control mode. Second control information S2 can be provided by the first machine controller 2 not only via data lines 14, 16, 38 and data interface 8, but also wirelessly via a Bluetooth connection or a radio link between the first machine controller 2, the second machine controller 6 and the third machine controller 12.

Figure 5:
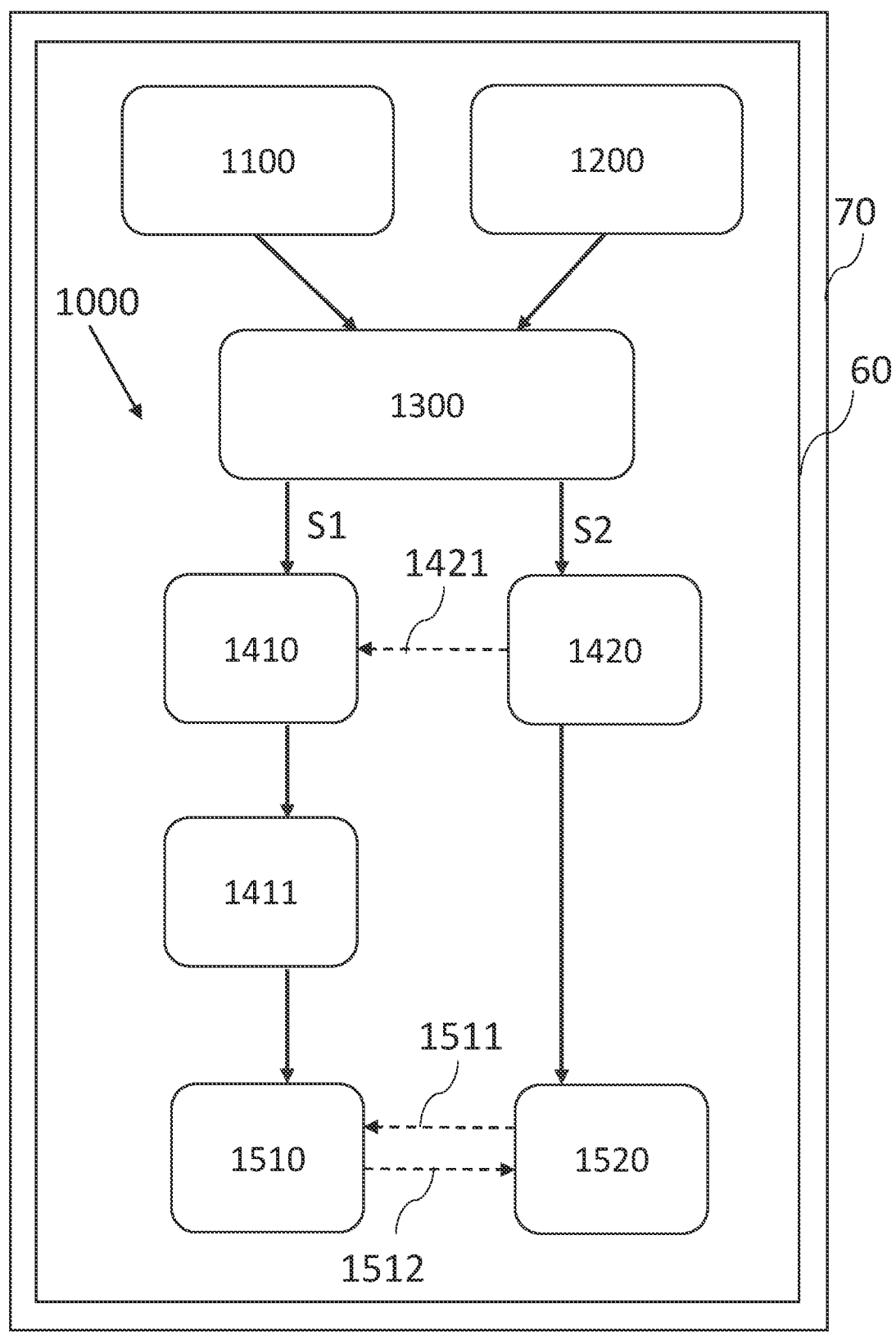
FIG. 5 is a first embodiment of a method for operating a filling line as shown in FIG. 1.

FIG. 5 shows a schematic view of a method 1000 for operating a filling line as shown in FIG. 1. Method 1000 is preferably carried out by a computer program 60 running on a processor 70.

Method 1000 comprises the step of connecting, for control communication, a first machine controller 2 (cf. FIG. 1) of a filling machine to a data interface in step 1100. Method 1000 further comprises the step of connecting, for control communication, a second machine controller 6 (cf. FIG. 1) of a second filling machine 4 to the data interface in step 1100. Here, the method further comprises the step of providing control information S1 to the first machine controller 2 (cf. FIGS. 1, 2a, 2b) in step 1300. Following the providing of control information in step 1300, method 1000 comprises the step of initializing a first target control mode in the first machine controller 2 (cf. FIG. 1) in step 1410. Here, the first target control mode is a master control mode indicated by first control information S1. Method 1000 further comprises the step of initializing a second target control mode in the second machine controller 6 (cf. FIG. 1) in step 1420, according to the second control information S2 provided. Here, the second target control mode is a slave control mode. The second machine controller 6 (cf. FIG. 1) is configured in slave control mode to transfer read and write rights, in particular full read and write rights relating to recipe-relevant process parameters, to the first machine controller 2 (cf. FIG. 1) in step 1421. The first machine controller 2 (cf. FIG. 1) is configured in master control mode to implement the transferred read and write rights in step 1411. This implementation includes, in particular, the visualization of the process parameters on a display unit 26, and setting them via a control panel 24 (cf. FIG. 1). The display function of the first machine controller 2 or its display unit 26 (cf. FIG. 1) is thus extended to include the implemented process parameters.

Method 1000 further comprises the step of reciprocally operating the first machine controller 2 (cf. FIG. 1) in master control mode in step 1510 and operating the second machine controller 6 (cf. FIG. 1) in slave control mode in step 1520. During operation in master control mode, the first machine controller 2 (cf. FIG. 1) is configured to overwrite recipe-relevant process parameters in step 1512 and to fetch them continuously during operation in step 1511.

Figure 6:
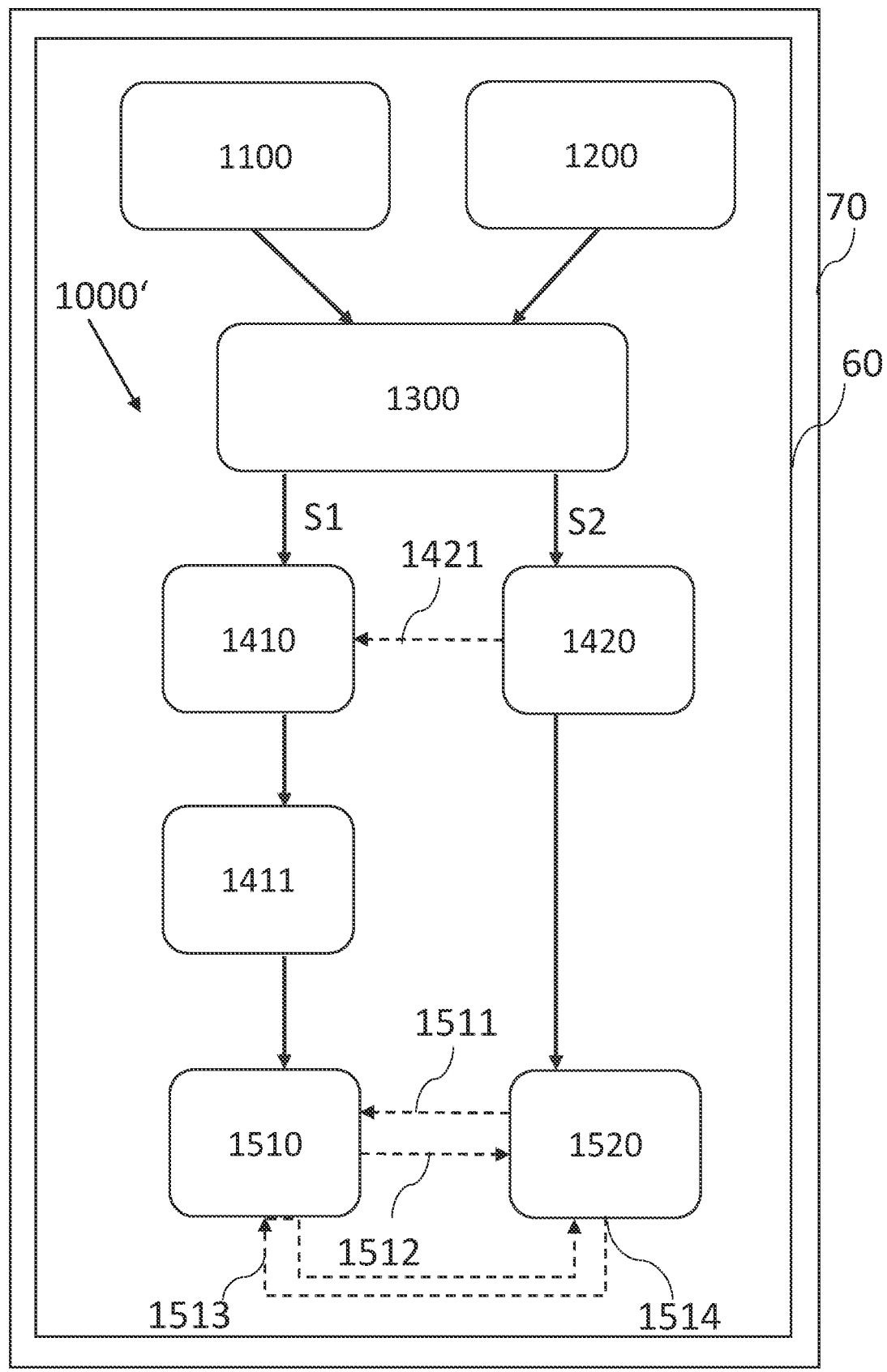
FIG. 6 is a second embodiment of a method for operating a filling line as shown in FIG. 1.

FIG. 6 shows method 1000', which is a development of method 1000 as shown in FIG. 5. Method 1000' is preferably carried out by a computer program 60 running on a processor 70.

Method 1000' differs from method 1000 only by an extended functionality of the first machine controller 2 (cf. FIG. 1) in master control mode. Reference is made in this regard to the above description of the method shown in FIG. 5, and only the differences in the steps of the process are discussed.

Unlike the method shown in FIG. 5, the first machine controller 2 is configured here during operation in master control mode according to step 1510 to also perform continuous condition monitoring of the second filling machine and to perform diagnostic processes in step 1513 on the basis of the condition monitoring. On the basis of the diagnostic processes, the first machine controller 2 is also configured in master control mode to switch off or stop the second filling machine 4 in the event of a malfunction, or to adjust recipe-relevant process parameters if need be, in step 1514. The adjustment of recipe-relevant process parameters and stopping or switching off the machine if the need arises applies in the same manner to the operation of the first filling machine, which is likewise controlled by the first machine controller 2 (cf. FIG. 1).

Figure 7:
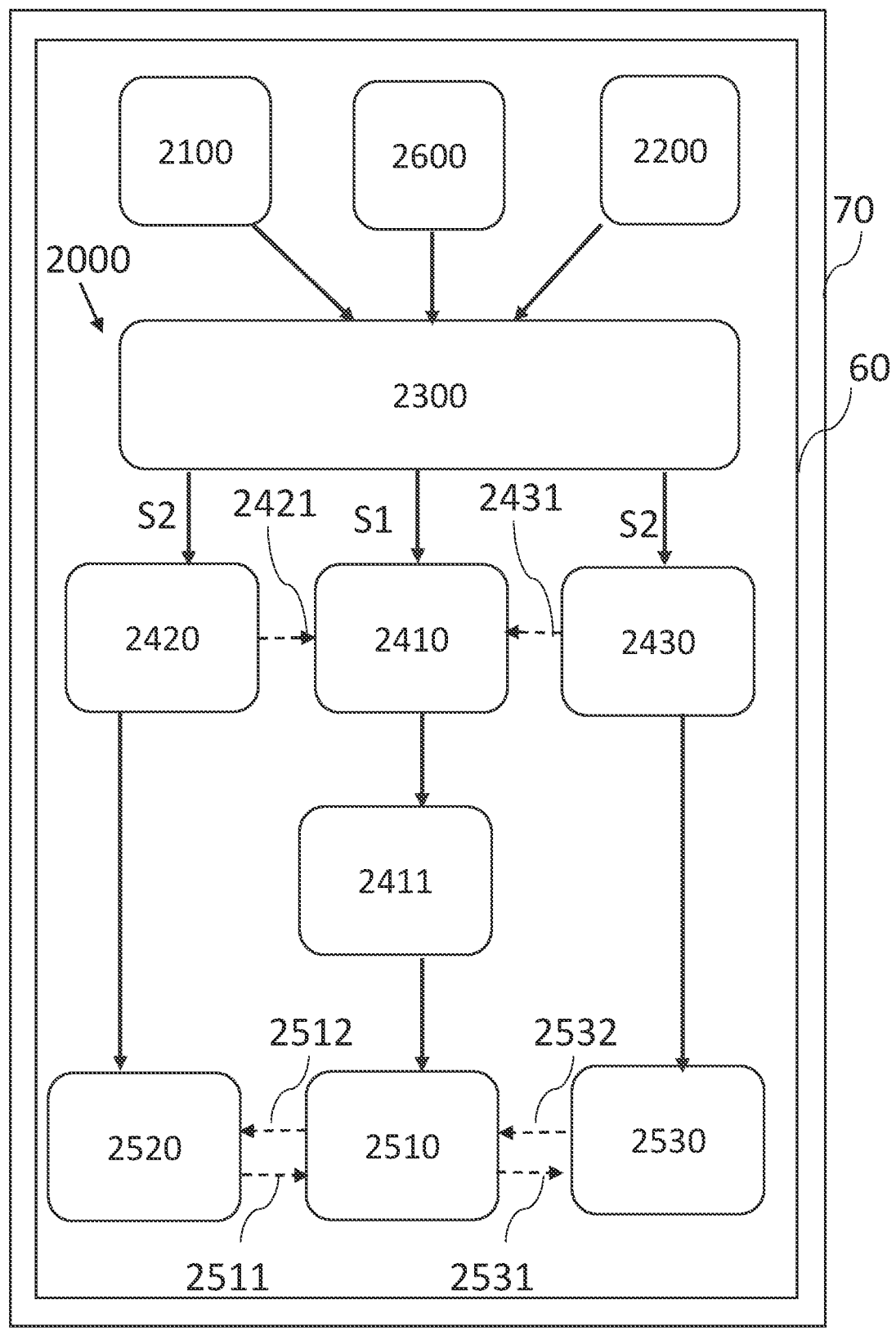
FIG. 7 is a preferred embodiment of a method for operating a filling line as shown in FIG. 3.

FIG. 7 shows a method 2000 for operating a filling line as shown in FIG. 3. Method 2000 is preferably carried out by a computer program 60 running on a processor 70.

Method 2000 comprises the step of connecting, for control communication, a first machine controller 2 of a filling machine 1 to a data interface 8 (cf. FIG. 3) in step 2100. Method 2000 further comprises the step of connecting, for control communication, a second machine controller 6 of a second filling machine 4 to data interface 8 (cf. FIG. 3) in step 2100. Method 2000 also comprises the step of connecting, for control communication, a third machine controller 12 of a front-end device 10 to data interface 8 (cf. FIG. 3) in step 2600.

Here, method 2000 further comprises the step of providing control information S1 to the first machine controller 2 (cf. FIGS. 4a, 4b) in step 2300. Following the providing of control information S1 in step 2300, method 2000 comprises the step of initializing a first target control mode in the first machine controller 2 (cf. FIG. 3) in step 2410. Here, the first target control mode is a master control mode indicated by first control information S1. Method 2000 further comprises the step of initializing a second target control mode in the second machine controller 6 in step 2420 and in the third machine controller 12 (cf. FIG. 3) in step 2430, according to the second control information S2 provided. Here, the second target control mode is a slave control mode. The second machine controller 6 and the third machine controller 12 (cf. FIG. 3) are configured in slave control mode to transfer read and write rights relating to recipe-relevant process parameters to the first machine controller 2 (cf. FIG. 3) in step 2421 and step 2431. The first machine controller 2 (cf. FIG. 3) is configured in master control mode to implement the transferred read and write rights in step 2411. This implementation includes, in particular, the visualization of the process parameters on a display unit 26, and setting them via a control panel 24 as shown in FIG. 2. The description of the display unit 26 (cf. FIG. 3) cooperating with the first machine controller 2 is thus extended to include the implemented process parameters.

Method 2000 further comprises the step of reciprocally operating the first machine controller 2 in master control mode in step 2510, operating the second machine controller 6 in slave control mode in step 2520 and operating the third machine controller 12 (cf. FIG. 3) in slave control mode in step 2530. During operating in master control mode, the first machine controller 2 (cf. FIG. 3) is configured to overwrite recipe-relevant process parameters relating to the second machine controller in step 2512 and relating to the third machine controller in step 2532. The first machine controller 2 (cf. FIG. 3) is also configured to continuously fetch, during operation, recipe-relevant process parameters relating to the second machine controller in step 2511 and relating to the third machine controller in step 2531.

The embodiments described above are only descriptions of preferred embodiments of the present invention, and are not intended to limit the scope of the present invention. Various variations and modifications can be made to the technical solution of the present invention by those of ordinary skill in the art without departing from the present invention. The variations and modifications should all fall within the claimed scope defined by the claims of the present invention.

What is claimed is:

1. A filling line for producing foods made of a pasty mass and that may be stuffed into casings, the filling line comprising:
    a first filling machine having a first machine controller,
    one or more second filling machines having a second machine controller, which is selectively operable in cooperation with the first filling machine and independently of the first filling machine, and
    a data interface for connecting the first machine controller and the second machine controller for control communication,
    wherein the first machine controller and the second machine controller are configured to be operated reciprocally either in a slave control mode or in a master control mode, depending on a control information provided to at least one of the first machine controller and the second machine controller, and
    wherein the slave control mode transmits read and write rights to the one of the first and second machine controller operated in the master control mode, and the master control mode implements the read and write rights in the one of the first and second machine controller operated in the master control mode.

2. The filling line of claim 1, wherein
    the control information is provided to the second machine controller.

3. The filling line of claim 1, wherein the control information is provided to both the first machine controller and the second machine controller.

4. The filling line of claim 1, wherein the read and write rights further include at least one of the following:
    machine configurations, and
    operating modes.

5. The filling line of claim 1, wherein read rights included in the read and write rights include at least one of the following:
   condition monitoring of the first filling machine operated in slave control mode,
   condition monitoring of the second filling machine operated in slave control mode, and
   process monitoring of the entire filling line.

6. The filling line of claim 5, wherein the one of the first and second machine controllers in master control mode are each configured by the condition monitoring to receive and to process at least one of the following:
   diagnostic data from the one of the first and second machine controller in slave control mode, and
   error messages from the one of the first and second machine controller in slave control mode.

7. The filling line of claim 5, wherein the one of the first and second machine controllers in master control mode are each configured by the process monitoring to receive and to process at least one of the following:
   diagnostic data from the one of the first and second machine controller in slave control mode, and
   error messages from the one of the first and second machine controller in slave control mode.

8. The filling line of claim 1, wherein the data interface is configured for real time data transmission between the first machine controller and the second machine controller and includes at least one of the following:
   a CAN bus and a bus line,
   an EtherCAT fieldbus and an Ethernet line,
   an Ether IP, and
   Ethernet with a potential-free contact.

9. The filling line of claim 1, wherein the control information includes a first control information indicating target operation in master control mode and a second control information indicating target operation in slave control mode.

10. The filling line of claim 9, wherein the data interface has at least one first slot and a second slot, the first control information is assigned to the first slot, and the second control information is assigned to the second slot.

11. The filling line of claim 10, wherein the data interface has a storage medium for storing the assignment of the control information to the first slot, and is configured to provide and transmit the control information to the first machine controller or the second machine controller connected to the first slot.

12. The filling line of claim 10, wherein the first machine controller and the second machine controller each has a scanning function and is configured to retrieve the control information assigned to the first or second slot when connected to the data interface.

13. The filling line of claim 9, further comprising:
   a computer program and a processor for running the computer program, which is connected to at least one of the first machine controller and second machine controller and is configured to do at least one of the following when running the computer program:
      provide at least the first control information to the first machine controller,
      provide at least the first control information to the second machine controller, and
      provide at least the first control information to the first machine controller and to the second machine controller.

14. The filling line of claim 10, wherein the first machine controller and the second machine controller are each configured to also retrieve a slot occupancy via the data interface by a scanning function and, in the event that the first slot and the second slot are occupied, to switch into master control mode or into slave control mode, depending on the control information.

15. The filling line of claim 9, wherein the first filling machine has a first control panel and the second filling machine has a second control panel, wherein the first and second machine controllers are each configured to disable the first or second control panel of whichever of the first filling machine or the second filling machine is operated in slave control mode,
   wherein the first control panel is configured to provide the first control information to the first machine controller by manual input, and
   the second control panel is configured to provide the first control information to the second machine controller by manual input.

16. The filling line of claim 9, wherein the first machine controller and the second machine controller are configured in master control mode to provide the second control information.

17. The filling line of claim 1, further comprising:
   a front-end device having a third machine controller which is in control communication with the first machine controller and the second machine controller via the data interface,
   wherein the third machine controller is configured to be operated in slave control mode, depending on the control information provided, when there is control communication via the data interface, wherein two of the first, second, and third machine controllers are always operated in slave control mode.

18. The filling line of claim 15, wherein the first filling machine and the second filling machine each has a display unit that cooperates with the first or second machine controller, and the first and second control panel and the display units are configured in master control mode to display the implemented read and write rights and the read and write rights of the one of the first or second machine controller in master control mode.

19. The filling line of claim 1, wherein the first machine controller and the second machine controller are configured in master control mode to identify, when a first recipe-relevant process parameter is overwritten, all of the recipe-relevant process parameters, of at least the first filling machine and the second filling machine, that are associated with the overwritten first recipe-relevant process parameter, and to adjust them correspondingly to the first recipe-relevant process parameter.

20. A method for operating a filling line, comprising:
   providing the filling line of claim 1,
   a) connecting a first machine controller of a first filling machine to a data interface for control communication,
   b) connecting a second machine controller of a second filling machine to the data interface for control communication,
   c) providing a control information to at least one of the first and second machine controllers,
   d) initializing a first target control mode in the first machine controller and a second target control mode in the second machine controller, depending on the control information provided, wherein the two target control modes include a master control mode and a slave control mode,
      wherein the initialization of the slave control mode includes the transfer of read and write rights to the one of the first and second machine controller operated in master control mode, and wherein the initialization of the master control mode includes the implementation of the transferred read and write rights in the one of the first and second machine controller operated in master control mode, and
e) reciprocally operating the first machine controller and the second machine controller either in a master control mode or in a slave control mode, comprising the steps of fetching and overwriting the recipe-relevant process parameters of the first filling machine and the second filling machine by the machine controller in master control mode.

21. The method of claim 20, wherein the read rights include a condition monitoring of the first filling machine or the second filling machine operated in slave control mode, and operation of the first machine controller or the second machine controller in the master control mode further comprises at least one of:
 e1) receiving and processing at least one of the following:
  diagnostic data from the one of the first and second machine controller in slave control mode,
  error messages from the one of the first and second machine controller in slave control mode,
 that are provided by at least one of the following:
  an equipment condition monitoring system,
  a process monitoring system,
 e2) switching off the second filling machine in slave control mode,
 e3) stopping the second filling machine in slave control mode,
 e4) adjusting recipe-relevant process parameters in the recipe settings by using the read and write rights, and
 e5) stopping the second filling machine in the master control mode.

22. The method of claim 20, wherein the read rights include process monitoring of the entire filling line, and operation of the first machine controller or the second machine controller in the master control mode further comprises at least one of:
 e1) receiving and processing at least one of the following:
  diagnostic data from the one of the first and second machine controller in slave control mode,
  error messages from the one of the first and second machine controller in slave control mode,
 that are provided by at least one of the following:
  an equipment condition monitoring system,
  a process monitoring system,
 e2) switching off the second filling machine in slave control mode,
 e3) stopping the second filling machine in slave control mode,
 e4) adjusting recipe-relevant process parameters in the recipe settings by using the read and write rights, and
 e5) stopping the second filling machine in the master control mode.

23. The method of claim 20, wherein the data interface has at least one first slot, to which the control information is assigned, and a second slot, and step c) comprises at least one of:
 c1) transmission of the control information by the data interface when connected to the first slot, and
 c2) retrieval of the control information assigned to the first slot by a scanning function of the first machine controller and the second machine controller.

24. The method of claim 20,
wherein step c) further comprises:
 c3) providing the control information to at least one of the first and second machine controllers by manual input via a control panel.

25. The method of claim 20, wherein the control information is a first control information indicating target operation in master control mode, and wherein step c) further comprises:
 c4) provision of a second control information indicating target operation in slave control mode by the machine controller operated or to be operated in master control mode.

26. The method of claim 20,
wherein the read and write rights include at least one of the following:
 machine configurations, and
 operating modes,
  wherein operation of the first machine controller or the second machine controller in master control mode comprises:
 e5) fetching and overwriting include at least one of the following:
  machine configurations, and
  operating modes,
 of the first filling machine and the second filling machine by the one of the first and second machine controller in master control mode.

27. The filling line of claim 1, wherein the control information is provided to the first machine controller.

* * * * *